July 3, 1934.   A. L. SEABRA   1,965,058
PNEUMATIC WHEEL FOR VEHICLES
Filed Dec. 22, 1932
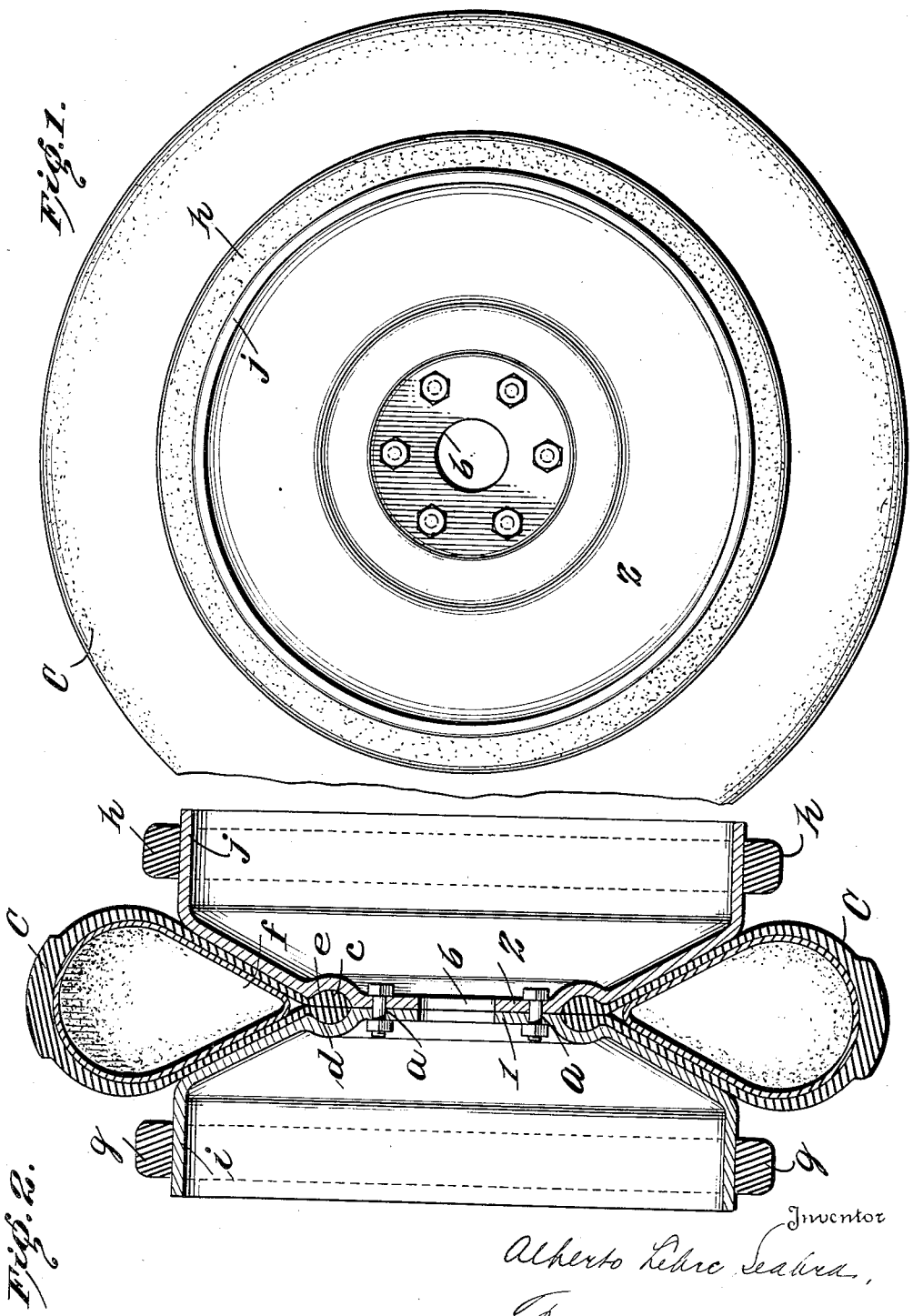
Inventor
Alberto Lebre Seabra
By [signature]
Attorney Patented July 3, 1934

1,965,058

UNITED STATES PATENT OFFICE 1,965,058

PNEUMATIC WHEEL FOR VEHICLES

Alberto Lebre Seabra, Sao Paulo, Brazil

Application December 22, 1932, Serial No. 648,472
In Brazil February 24, 1932

1 Claim. (Cl. 301—39)

I have filed application in Brazil Feb. 24, 1932 and in Germany on July 18, 1932.

This invention relates to wheels for pneumatic tires and it has for an object the provision of a means for preventing injury to the casing of a pneumatic tire should it collapse or become deflated when in use and the invention provides an emergency support for the vehicle to relieve the pneumatic casing of the weight of the vehicle and injury, due to the operation of the vehicle while the pneumatic tire is in disuse.

It is an object, furthermore, of this invention to provide a wheel having the usual function of holding a pneumatic tire casing in position for use and at the same time supporting tires for the aforesaid emergency purposes, it being understood that the emergency tires will not be subjected to wear or deterioration so long as the pneumatic tire is functioning.

It is, furthermore, an object of this invention to provide a wheel of the character indicated which can be constructed almost wholly by the usual metal stamping processes so that the cost of production is minimized without sacrificing anything of the strength and durability of the construction.

With the foregoing and other objects in view the invention consists in the details of construction and in the arrangement and combination of parts to be hereinafter more fully set forth and claimed.

In describing the invention in detail, reference will be had to the accompanying drawing forming part of this application, wherein like characters denote corresponding parts in the several views, and in which—

Figure 1 illustrates a view in elevation of a wheel embodying the invention having the tires applied thereto; and Figure 2 illustrates a sectional view thereof.

In the drawing 1 and 2 denote sections of the wheel which are adapted to be secured together by fastenings such as bolts, rivets or the like that may extend through the apertures $a$. The members 1 and 2 are disk-like at their central portion (or what might be termed the central zone) where they contact and are secured together as stated, and the said central portions each has an aperture $b$ one of which coincides with the other for the reception of a nave or hub. The members 1 and 2 are of course annular in elevation and they are provided with oppositely disposed annular channels $d$ and $e$ which form a seat $c$ for the beads ordinarily employed on pneumatic tire casings C. It is obvious from an inspection of Figure 2 that when the casing is secured between the members 1 and 2 in the manner shown and the said members are held assembled by fastenings in the apertures $a$, the members 1 and 2 will serve to hold the pneumatic casing in restrained condition when the tire is inflated. The inner tube $f$ of the pneumatic tire occupies a position in the casing in a well known manner.

The portions of the members 1 and 2 beyond the channels diverge to form a clearance for the reception of the sides of the casing and these diverging portions act to support the said casing and prevent de-formation thereof.

So long as the pneumatic tire is inflated it will, of course, assume the position illustrated, but should it become deflated or collapse the space between the diverging portions of the members 1 and 2 will act as a seat into which the tire will be pressed by the load of the vehicle.

The diverging portions of the members 1 and 2 terminate in annularly disposed flanges $i$ and $j$ and they constitute rims or treads which support the vehicle when the pneumatic tires are in disuse. In order to provide for the smooth operation of the vehicle, cushion tires $g$ and $h$ are applied to the flanges and these of course may be of any appropriate type preferably having efficiency for absorbing jar and vibration incident to the operation of the wheels over the roadbeds which would otherwise subject them to shocks.

I claim:

In a pneumatic wheel for vehicles, disk-like members, means for securing the disk-like members together, each of said disk-like members having an annular channel, said channels being opposed to form a seat for the beads of a tire, the said disk-like members terminating in oppositely disposed annular flanges and the said disk-like members diverging with relation to each other from the channels to the flanges to form an annular space, a pneumatic tire positioned in said space with its side walls resting on the diverging portions of said disk-like members and its beads seated in said annular channels, and auxiliary tires on the annular flanges, said pneumatic tire, when inflated, projecting radially outwardly beyond said auxiliary tires but adapted, when deflated, to collapse in said annular space and between said auxiliary tires so that the latter assume the load of the wheel.

ALBERTO LEBRE SEABRA.